United States Patent [19]

Filippazzi

[11] 3,868,655

[45] Feb. 25, 1975

[54] THREE DIMENSIONAL OPTICAL ASSOCIATIVE MEMORY

[75] Inventor: Franco Filippazzi, Milano, Italy

[73] Assignee: Honeywell Information Systems Italia, Caluso, Italy

[22] Filed: Nov. 1, 1973

[21] Appl. No.: 411,950

[30] Foreign Application Priority Data

Nov. 29, 1972 Italy .................................. 32200/72

[52] U.S. Cl. ... 340/173 AM, 340/173 LM, 350/150

[51] Int. Cl. ........................ G11c 15/00, G11c 13/02

[58] Field of Search ............. 340/173 LM, 173 AM; 350/150, 160 R

[56] References Cited

UNITED STATES PATENTS 3,407,393 10/1968 Haas et al. .................... 340/173 AM

*Primary Examiner*—Stuart N. Hecker
*Attorney, Agent, or Firm*—Fred Jacob

[57] ABSTRACT

A three dimensional optical associative memory includes a plurality of optical supports arranged in a stack. Each optical support has a plurality of bit regions, each region comprising three areas, one of which is always transparent and the other two of which are respectively transparent or opaque, or vice versa, according to the binary value of the recorded bit. Collimated beams of polarized light illuminate the different bit regions, and electrically controlled beam shifting devices, including polarization rotators, are interleaved between the supports for shifting the beams to strike selectively ones of the three areas of the bit regions. Photodetectors are employed for detecting the light emerging from each word line formed by the bit regions in order to interrogate contemporaneously all of the optical supports.

8 Claims, 4 Drawing Figures

THREE DIMENSIONAL OPTICAL ASSOCIATIVE MEMORY

BACKGROUND OF THE INVENTION

The present invention relates to an associative ready-only optical memory device, suitable for data processing, and, more particularly, for information retrieval systems.

It is known that the memories usually employed, called "addressable memories," require, for retrieving the information contained in one or more memory cells, the knowledge of the address of these cells. On the contrary, for associative memories, the whole or the partial knowledge of the information possible contained in some memory cell enables the memory either to identify the cells containing such information or to ascertain that the required information is not contained in any interrogated cell. In addition, it is possible to read-out the whole information contained in these cells, the information content of which was only partially known before.

It is clear that associative memories may be of paramount interest for the technique of electronic computers, primarily for handling information files. According to a typical application, assuming that the abstracts of all book and publications contained in a library have been recorded in such files, it is possible, by the associative memory technique, to find out all abstracts containing predetermined key words defining approximately the content of the publications, and thus identify the publications which are more or less connected with a subject or a group of subjects. These operations pertain to the technique of "information retrieval."

In view of this interest, many attempts have been carried out and many experimental models built in order to obtain satisfactory associative memories. Almost all the technologies employed in the field of addressable memories have been tested for this purpose: specifically, the technologies of the superconductor, the magnetic core, the thin film and others; a rather complete list of these technologies is given at page 511 of the article by A. C. Hanlon "Content Addressable and Associative Memory Systems — A Survey", published in I.E.E.E. Transactions on Electronic Computers, Vol. EC 15, No. 4, Aug. 1966.

These attempts have met with varied success, but not one has until now asserted itself, for different reasons, primarily because of the difficulty of obtaining at moderate costs a high information density, a high number of input-output channels, and a high operating speed, which are required for adequately exploiting the characteristics of the associative memories.

An optical associative memory system is described in the copending U.S. application Ser. No. 374,624, filed June 28, 1973, by applicant's assignee. According to this invention, the words recorded in the memory and which can be associatively interrogated are contained on a single photographic plate. If all of the information recorded in a file memory cannot be contained on a single plate, the associative interrogation of the file has to be repeated for several plates, or optical supports. This requires time, and mechanical operations, for the interrogation of several plates in succession.

SUMMARY OF THE INVENTION

The three dimensional optical associative memory system according to the present invention obviates such inconveniences by interrogating contemporaneously different photographic plates containing a large quantity of recorded information and arranged in a stack.

The invention provides substantially a plurality of optical supports for the information on which the information is recorded by means of transparent and opaque areas in regions assigned to the single bits of each word, the bits of equal order of all words being recorded on each plate. Each region comprises three areas, one of which is always transparent, the other two being respectively transparent and opaque, or vice versa, according to the binary value of the recorded bit. The information supports are stacked together so that the regions of the bits of each word are aligned.

The system according to the invention comprises, in addition, a device for selectively illuminating the different bit regions with collimated beams of polarized light; means for detecting the light emerging from each word line formed by the bit regions; and electrically controlled beam shifting devices, interleaved between the information supports, for parallel shifting of the beams, by a predetermined distance in a choosen direction, thus selectively letting the beam strike one of the three areas of each bit region. The interrogation is effected by predisposing the control of the beam shifting devices in accordance with the interrogation word in such a way that if one or more recorded words match the interrogation words, the beams corresponding to these words, in their travel, find transparent areas only and therefore can emerge from the stack and cause the detecting device to emit an output signal. All words are interrogated at a time according to the same interrogation word, and the addresses of the recorded words matching the interrogation word are read-out by scanning the detecting device, which comprise as many photodetectors as there are recorded words.

SHORT DESCRIPTION OF THE DRAWINGS

These and other advantages and features of the invention will appear clearly from the following detailed description of a preferred embodiment with reference to the attached drawings, in which.

DESCRIPTION OF A PREFERRED EMBODIMENT

Figures 1, 3:
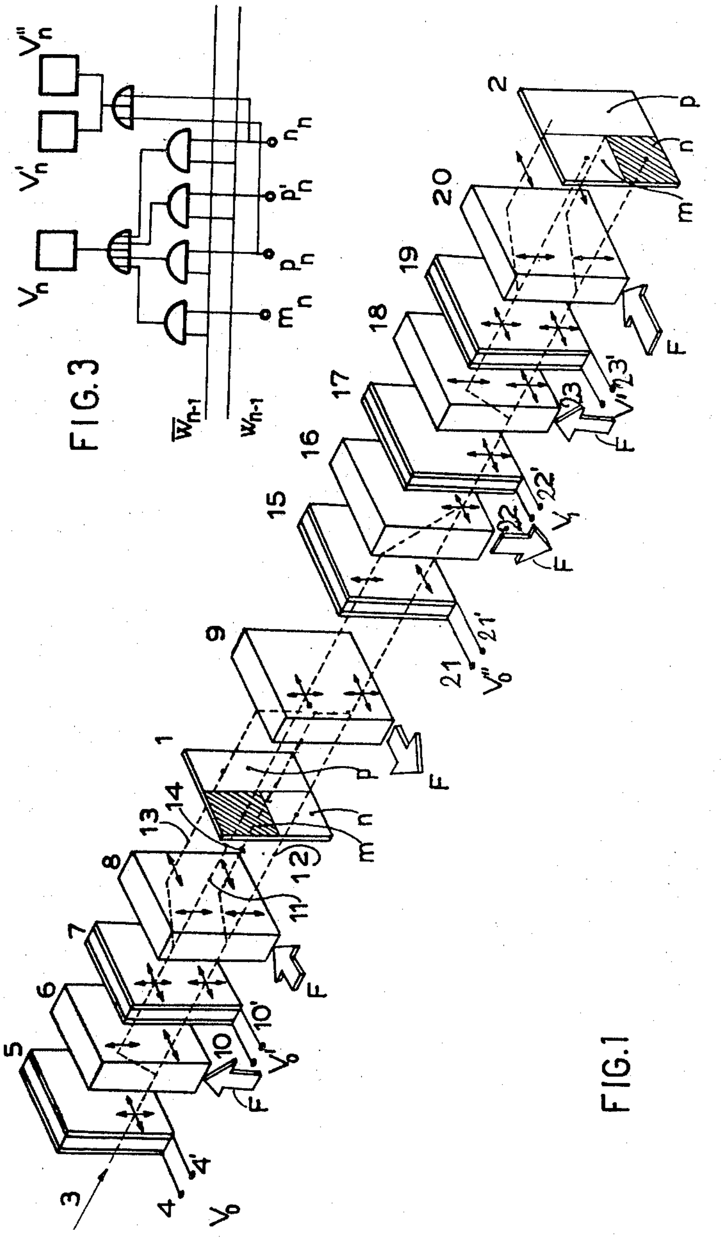
FIG. 1 is a partial and schematic representation, in perspective exploded form, of an optical memory register according to the invention.
FIG. 3 is a variant of the logical diagram of the control device.

FIG. 1 is a partial representation of the principle of the invention, applied, as a simplified example, to a single register of an optical memory wherein a single N-bit word is recorded. It comprises N plates of transparent material, the binary value of each bit being represented by rendering opaque an elementary area of the plate, for instance by photographic means.

This method of recording the information is suitable for read-only, not modifiable, memories, to which, in particular, the invention is related. However, it is possible to obtain the recording in an alterable form, for example by using photochromic material on which the information may be recorded and erased by using radiation of suitable wavelength.

FIG. 1 shows in perspective and exploded form a portion of this register, comprising the first two bits, recorded on bit regions of photographic plates indicated by 1 and 2, through which a beam 3 of monochromatic light may pass. This beam may, for example be generated by a solid state laser, not shown in the figure. Each bit region of the plate is subdivided in three areas, two of them, *m* and *n*, occupying the right half with respect to the direction of the beam. These areas are, respectively, opaque and transparent, or vice versa, according to the binary value of the recorded bit. For example, if the bit is ONE, the area *m* is opaque and the area *n* transparent; the contrary is true if the bit is ZERO. The left half of the region is the area *p*, which is always transparent.

Before plate 1, and between plates 1 and 2, are located electrooptic devices of known type for displaying the beam, these devices being briefly described herein for a better understanding of the invention, arranged in a way conforming to the described embodiment. Each one of said devices comprises substantially a plate of electro-optical material, such as the plates indicated by 5, 7, 15, 17, and 19. These plates are, for instance, formed of potassium dideuterate phosphate (briefly KDP) corresponding to the chemical formula $K\,D_2\,PO_4$ and have transparent electrodes on both surfaces to which a voltage may be applied for rotating the polarization plane of the emerging ray by 90° with respect to the incident ray. These devices will be hereafter called "polarized rotators" or simply "rotators."

Each electro-optical device comprises in addition a slab of birefringent calcite crystal such as those indicated by 6, 8, 9, 16, 18, and 20. The orientation of the surfaces of these slabs with respect to the optical axis of the crystal is such that a beam polarized, for example, in a horizontal plane emerges in the same position as the incident beam, whereas a beam polarized in the vertical plane is shifted in a vertical direction with respect to the incident beam by a distance depending on the thickness of the plate, remaining parallel to the direction of the incident beam. For a different orientation of the crystal axis, a beam polarized on the vertical plane, on the contrary, is not shifted, whereas a beam polarized in the horizontal plane is shifted in a horizontal direction. The arrows F of FIG. 1 indicate, for each slab of calcite, the direction of the shift of the beam when its polarization plane is parallel to the direction of the arrow.

Assuming that, initially, the beam 3 is polarized in a horizontal plane, it emerges from the polarization rotator 5 either horizontally or vertically polarized according to whether or not voltage $V_o$ is applied to terminals 4 and 4'. Correspondingly, it emerges from the calcite slab 6 either in the same position, if the polarization is horizontal, or vertically shifted by a distance equal to the distance between the centers of the areas *m* and *n* of the plates 1 and 2, if the polarization is vertical. Reference numerals 7 and 8 indicate the polarization rotator and the calcite crystal composing a second electro-optical device the same as the preceding one, but having the crystal so oriented that the beam is shifted in a horizontal direction toward the left by a distance equal to the distance between the center line of the rectangle comprising the areas *m* and *n* and the center line of rectangle *p*, if the polarization plane of the beam is horizontal; whereas it is not shifted, if the beam is polarized vertically: the plane of polarization of the beam depends on whether a voltage $V'_0$ is applied to the terminals 10 and 10' of rotator 7. It follows that the beam emerging from the slab 8 may occupy one of the four positions indicated by 11, 12, 13 and 14. The first one corresponds to the center of the area *m*, the second to the center of the area *n*, and the other two to the area *p* of the plate 1. In positions 11 and 12, the beam is polarized vertically; in positions 13 and 14 it is polarized horizontally.

Following the plate 1 there is a calcite crystal 19 oriented as shown by the arrow F; since the beam in positions 13 and 14 is horizontally polarized, the crystal slab shifts the beam from either of these positions respectively to positions 11 or 12. This crystal is followed by an electro-optical device comprising the polarization rotator 15 controlled by the voltage $V''_0$ applied to the terminals 21 and 21', and by the calcite crystal 16 oriented for shifting the beam from position 11 to position 12 coincident with the originally incident beam position 3. In this position 12, the beam may be polarized either horizontally or vertically.

The relation between the voltages $V_o$, $V'_o$, and $V_o''$, the areas of the plate struck by the beam, and the polarization plane of the beam in position 12, as it emerges from crystal slab 16, are given by the following table, wherein the binary value "1" or "0" is affixed to the variables $v_o$, $v'_o$ and $v''_o$ according to whether the respective voltage $V_0$, $V'_0$, and $V''_0$ are applied or not; to the variables $m_o$, $n_o$, and $p_o$, whether or not the beam strikes the respective areas *m*, *n*, and *p* of plate 1; and to the variable $w_o$ according to whether the polarization of the beam emerging from the crystal 16 is vertical or horizontal.

| $v_o$ | $v'_o$ | $m_o$ | $n_o$ | $p_o$ | $v''_o$ | $w_o$ |
|---|---|---|---|---|---|---|
| 0 | 0 | 0 | 0 | 1 | 0 | 0 |
| 0 | 1 | 0 | 1 | 0 | 1 | 0 |
| 1 | 0 | 1 | 0 | 0 | 0 | 1 |
| 1 | 1 | 0 | 0 | 1 | 1 | 1 |

Note that $w_o = v_o$ and $v''_o = v'_o$.

Following the crystal slab 16 there is an electrooptical device which is the same as the one preceding plate 1, comprising a rotator 17, controlled by the voltage $V_1$ applied to terminals 22 and 22', a calcite crystal 18, a rotator 19 controlled by the voltage V' applied to terminals 23 and 23', and a calcite crystal 20.

After plate 2 there are a calcite crystal oriented in the same manner as crystal 9 and an electrooptical device, corresponding to the device composed of rotator 15 and crystal 16, controlled by a voltage $V''_1$; all of these devices are not shown in the figure.

In this case, the polarization plane of the beam incident on rotator 17 may be horizontal or vertical, and is represented by the binary variable $w_o$, which, as said, is equal to $v_o$.

The relations between variables $v_1$, $v'_1$, $v''_1$ representing the voltages $V_1$, $V'_1$, $V''_1$, the variables $m_1$, $n_1$, $p_1$ representing the corresponding areas struck by the beam, and the variables $w_o = v_o$ and $w_1$, respectively representing the polarization plane at the input and at the output of the electrooptical device for the second bit, are given by the table:

| $v_o$ | $v_1$ | $v'_1$ | $m_1$ | $n_1$ | $p_1$ | $v''_1$ | $w_1$ |
|---|---|---|---|---|---|---|---|
| 0 | 0 | 0 | 0 | 0 | 1 | 0 | 0 |
| 0 | 0 | 1 | 0 | 1 | 0 | 1 | 0 |
| 0 | 1 | 0 | 1 | 0 | 0 | 0 | 1 |
| 0 | 1 | 1 | 0 | 0 | 1 | 1 | 1 |
| 1 | 0 | 0 | 1 | 0 | 0 | 0 | 1 |
| 1 | 0 | 1 | 0 | 0 | 1 | 1 | 1 |
| 1 | 1 | 0 | 0 | 0 | 1 | 0 | 0 |
| 1 | 1 | 1 | 0 | 1 | 0 | 1 | 0 |

from which it follows, in particular that
$v''_1 = v'_1$, and that $w_1 = \bar{v}_o v_1 + v_o \bar{v}_1$.

From the table, which is valid for each bit following the first one, it is possible to deduce the logical network which determines which variable $v_n$ and $v'_n$ must be ONE, that is, which voltages, respectively $V_N$, and both $V'_N$ and $V''_N$, must be applied to the respective pair of terminals, when it is desired that the beam strikes the area $m$, $n$ or $p$ of the N-th bit. These variables depend, in general, from the value of the variable w representing the polarization plane of the beam emerging from the preceding bit N − 1.

Figure 2:
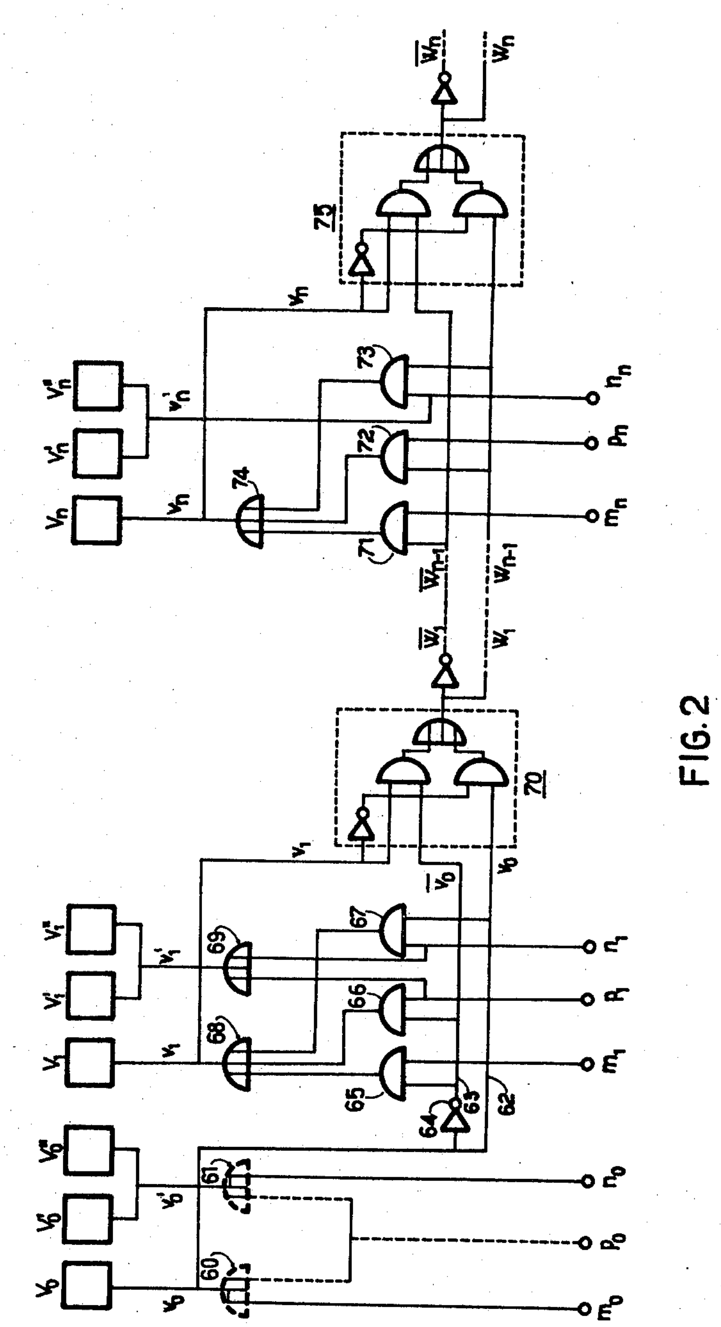
FIG. 2 is the logical block diagram of the control device for the applied voltages.

In FIG. 2, an example is shown of the logical block diagram of the control network for the applied voltages limited to the sections for the first, the second, and the N-th bit. Each section comprises three power switches V, V′ and V″ which are controlled, the first one by the variable $v$, the other two both by the variable $v'$. These switches when operated apply the voltage for rotating the polarization plane, respectively, of the first, the second and the third rotator.

Each section comprises three input terminals $m$, $n$ and $p$: a level ONE signal will be applied to a single one of these terminals according to whether it is desired that the beam strikes the corresponding area of the bit regions. It has been shown that the beam may strike the area $p$ in two different positions, indicated by 13 and 14 in FIG. 1, corresponding to two different combinations of the voltages V and V′. It follows that the control network may be designed in two different ways, according to whether the beam should strike the upper or the lower part of the area $p$. In the first section, corresponding to the first bit, and assuming that the incident beam is horizontally polarized, the control network may consist simply, as shown in solid line in FIG. 2, in the connection of the terminal $m_o$ to the power switch $V_o$, and of the terminal $n_o$ to switches $V'_0$ and $V''_0$, the terminal $p_o$ remaining unconnected. It is easy to verify that the beam, in the absence of control signals, strikes the lower part of the area $p_o$. The circuit may, instead, comprise two OR gates 60 and 61, as shown in dashed line in FIG. 2. In this case, the application of a signal ONE to the terminal $p$ operates all three switches, and the beam strikes the upper part of the $p$. In any case, the application of signal ONE to the terminal m only causes the operation of switch $V_o$, and the application of signal ONE to the terminal $n$ only causes the operation of the switches $V'_0$ and $V''_0$. The variable $v_o$, representative of the polarization plane at the output of the first bit, is applied to the input of the second section either directly through line 62, or in complemented value through the inverter 64 and line 63.

The second section of the block diagram of FIG. 2, comprising the control terminals $m_1$, $p_1$, and $n_1$, and the power switches $V_1$, $V'_1$, and $V''_1$, shows the logical block diagram of the network which controls the shifting of the beam to the region $m$, $n$, and to the upper part of the region $p$. It comprises the AND gates 65, 66, and 67 and the OR gates 68 and 69. If the polarization of the incident beam is horizontal ($\bar{v}_o = 1$), the AND gates 65 and 66 are enabled and the gate 67 is inhibited. Therefore, a signal "1," applied to the terminal $n$ only, operates the switches $V'_1$ and $V''_1$, and a signal "1" applied to terminal $p$ only causes the operation of all three power switches. On the contrary, if the polarization plane of the incoming beam is vertical ($v_o = 1$), the AND gates 65 and 66 are inhibited, and AND gate 67 is enabled. The signal "1" on terminal $m_1$ is without effect: the same signal on terminal $m_1$ operates all the switches, whereas the signal on terminal $p$ operates only switches $V'_1$ and $V''_1$. It is easy to see, from FIG. 1, that in any case the resulting effect is as wanted. The logical network contained in the dashed-line box 70, corresponding to the logical function "exclusive OR," combines the variables $v_o$ and $v_1$, and their complements, in such a way as to deliver at the output the variables $w_1 = \bar{v}_o v_1 + v_o \bar{v}_1$, representative of the polarization plane at the output of the second bit.

The logical network for each following bit may be the same as the logical network described for the second bit. However, by way of example, FIG. 2 shows for a generic $n$-th bit, the logical network in case the beam should strike the lower part of the $p$ area. It comprises the AND gates 71, 72, and 73 and the OR gate 74. If the polarization of the beam emerging from the preceding bit is horizontal ($\bar{w}_{n-1} = 1$), only the gate 71 is enabled, and a signal "1" applied to one of the terminals $m_n$, $n_n$, and $p_n$ causes, respectively, the operation of switch $V_n$ alone, or or the operation of both switches $V'_n$ and $V''_n$ or no operation of any switch. If the polarization is vertical ($w_{n-1} = 1$) the AND gate 71 is inhibited and the gates 72 and 73 are enabled; the signal applied to one of the terminals $m_n$, $n_n$, $p_n$ operates, respectively, no switch or the single switch $V_n$. The logical network "Exclusive OR" contained in the box 75 combines the variables $w_{n-1}$ and $v_n$, and their complements, to deliver the variable $w_n$ representative of the polarization at the output of the $n$-th bit.

The block diagram of FIG. 3 is obtained by the combinations of the second and third sections of FIG. 2 and contains two terminals $p$ and $p'$: the signal "1" on $p$ shifts the beam to the upper part of the area $p$, the signal on $p'$ to the lower part of the same. It is thus possible to program the application of the signal either to terminal $p$ or to terminal $p'$ depending on the polarization of the beam emerging from the preceding bit in order to minimize the voltages applied to the rotators of polarization.

Assume, for example, that the whole register comprises light plates recording a bit each, that the recorded word is 1 1 0 1 0 1 1 0, and that the interrogation word is 1 1 0 X 1 0 XX with the "don't care" bits being represented by the Xs. The "1" signal must be applied to the terminals $n$ of the first, second, and fifth bits; to the terminal $m$ of the third and sixth bit, and to the $p$ terminals of the fourth, seventh and eighth bits. Accordingly, the beam strikes the corresponding areas in the respective bits. If the recording is made by rendering opaque the area $m$ for recording a ONE, and the area $n$ for recording a ZERO, the beam strikes transparent areas in all plates, emerges after having passed through the whole device, and is detected by a photodetector device, which emits a signal signifying the matching of the recorded word to the interrogation word.

In practice, the invention is advantageously employed when a rather large number of words, having a high number of bits per word, must be interrogated.

Figure 4:
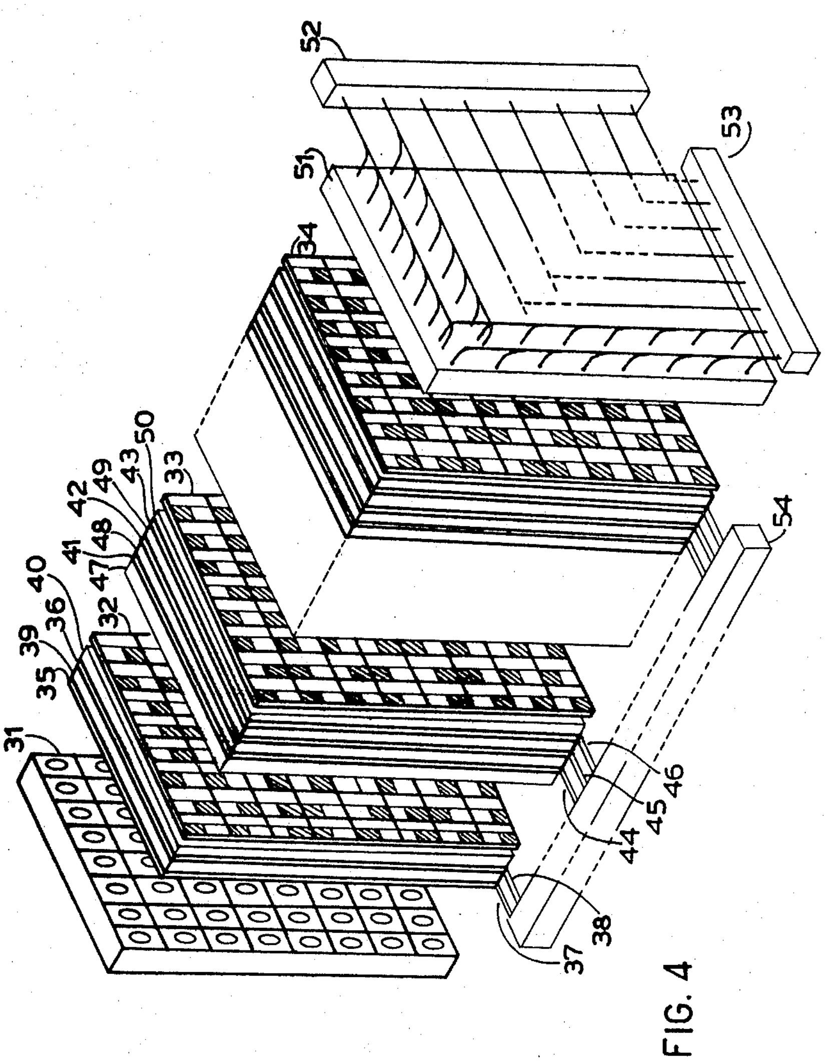
FIG. 4 shows in partial and perspective form the optical associative memory according to the invention.

FIG. 4 represents a device according to the invention, for interrogating a set of photographic plates on which, for instance, 8 × 8 = 64 words are recorded, each plate recording a bit of the name order of all words. The plates comprise 8 × 8 regions, each region comprising the areas corresponding to areas *m*, *n*, and *p* of FIG. 1. Reference numeral 31 indicates in FIG. 4 a matrix of 8 × 8 light sources, each one capable of emitting a very thin, monochromatic and collimated beam, polarized in a predetermined plane, for instance, in the horizontal plane.

This illuminating device may, for instance, be a matrix of solid state lasers, the emission of the light by all lasers being controlled by a simultaneous application of a suitable voltage to all lasers. Alternatively, a single light source, and an optical device of the "fly eye" type may be provided, for generating 8 × 8 thin collimated, monochromatic and polarized beams. Each beam is in a position corresponding, for instance, to the area *m* of each of the 64 bit regions of all photographic plates. FIG. 4 indicates by numerals 32, 33 and 34, respectively, the first, the second and the last one of N photographic plates, on which the first, the second and the last bits of the 64 N-bit words are recorded.

In front of the first photographic plate there is an electrooptical device comprising the polarization rotators 35 and 36 controlled by the pairs of leads 37 and 38, and the calcite crystals 39 and 40, corresponding respectively to rotators 5 and 7 and to calcite crystals 6 and 8 of FIG. 1, capable of shifting all the beams emerging from the illuminating device 31 from area m to areas n or p of each region of the plate. In front of the plate 33 there is an electrooptical device comprising the three rotators 41, 42, and 43 controlled by the three pairs of leads 44, 45 and 46 and the four calcite crystals 47, 48, 49 and 50, corresponding respectively to rotators 15, 17, and 19 and to the calcite crystals 9, 16, 18 and 20 of FIG. 1, and having the same functions. Other electrooptical devices, identical to the one located in front of the plate 33 are located in front of each one of the following plates. After the last plate 34 there is a photodetector matrix 51, comprising 8 × 8 = 64 elements each element being so arranged, as to receive a beam emerging from each one of the 64 bit regions of plate 34. Each photodetector may be constituted by a photoresistor parallel connected to a capacitor, as the device describes in the above-named application Ser. No. 374,624. The photoresistor terminals are connected respectively to row and column leads connected to reading-out circuits represented on the whole by the boxes 52 and 53. The leads controlling the polarization rotators are connected to the interrogation circuit represented by the box 54.

At the beginning of the interrogation, all the capacitors of the detecting device 51 are charged to a predetermined voltage. To interrogate all the recorded words, by a common interrogation word, the voltages of the polarization rotators are set by the circuit 54, as explained before, in such a way that all the beams are intended to strike the *n* areas of all the bits corresponding to a ONE in the interrogating words, the *m* areas of the bits corresponding to ZERO in said words, and the *p* areas for the "don't care" bits. Then, letting the illuminating device emit the beams, all the beams, and these alone, illuminating a word which matches the interrogation word, strike transparent areas in every bit plate, and may arrive at the corresponding photodetectors of the matrix 51, causing the substantial reduction of the resistance of the photoresistor and discharging the corresponding connected capacitor. By the reading-out circuits 52 and 53, and other, not shown, controlling and recording devices already known, it may be detected and recorded which photodetecting elements have been struck by a light beam, and, therefore which words match the interrogation word.

By an alternative embodiment, a single photodetector may be located at the output of the memory, provided with an optical device allowing it to be reached by any beam emerging from the stack of plates. In this case, the illumination of the single words is effected in succession by an optoelectronic device; for instance, each laser of the solid-state laser matrix 31 is selectively coincidence-controlled so that each laser emits the beam in succession, thus scanning in succession all the single words. The emission of a pulse by the single output photodetector indicates that the word scanned in the same moment is matching the interrogation word. The scanning in succession of all the words may also be obtained by a single source of monochromatic collimated light and by a bidimensional digital beam shifting device, obtained by employing polarization rotators and calcite crystals whose thickness is doubled in succession, according to an arrangement already known and described, for instance, in the book Optical and Electrooptical Information Processing published by Massachusetts Institute of Technology Press, Cambridge, Mass. at Chapter 23, p. 371, "Convergent Beam Digital Light Deflector" by M. Kulke et al.

The density of the recorded optical information may be increased if each bit region is shaped as a rectangle comprising three adjacent superimposed square areas, among which, for instance, the lower one corresponds to area *m*, the middle one to the always transparent area *p*, and the upper one to the area *n*. In the initial condition, the beam should strike the *m* area; and the electrooptical devices in front of each recording plate comprise two devices adapted for vertically shifting the beam by one or two intervals corresponding to the distance between the center of two adjacent square areas. Since the beam emerging from the upper area *n* is always polarized in a vertical plane, the device following the plate for returning the beam in the initial position comprises a calcite crystal adapted for shifting by a single interval toward the lower square, each vertically polarized beam, and an electrooptical device for shifting, if needed, in the same direction the beam for another interval. The number of rotators and of calcite crystals is the same as in the preceding arrangements, and the control network may be derived from the same considerations.

While a preferred embodiment of the invention has been shown and described it will be apparent to those skilled in the art that changes can be made without departing from the principles and spirit of the invention, the scope of which is defined in the appended claims.

The invention claimed is:

1. An associative optical memory system for storing in memory locations binary information arranged in words composed of a plurality of bits and for retrieving the locations containing words matching at least in part with an interrogating word composed of a plurality of bits, comprising:

a plurality of optical recording supports, each for recording one bit of each of said words, each support comprising a plurality of bit recording regions, each region comprising a first bit area and a second bit area, each bit being recorded in said first area in either opaque or transparent form according to its value and being recorded in said second bit area in opposite form with respect to said first area, said recording supports being arranged in a stack with bit recording regions of each word in alignment;

radiation means for supplying at least a radiation beam for illuminating one of said bit areas of all the bit recording regions of a word;

a plurality of electrooptical beam shifting devices for transversely shifting said beam in response to shift control signals, each said beam shifting device being interposed between two subsequent recording supports and between said radiation means and a first of said recording supports;

shift control signal generating means coupled to said shifting device for generating signals according to an interrogating word and for shifting said beam in alignment with a predetermined one of said first or second bit area of each bit recording region of the same word, depending on the value of each bit of the interrogating word; and detecting means for detecting the beam emerging from said stack, when said beam is shifted to cross transparent areas in all the bit recording regions of said word.

2. An associative optical memory, comprising:

a plurality of optical recording supports for recording binary information as a function of the transparency of predetermined areas of said supports, each support comprising a bit recording region, each region comprising two bit recording areas, one of which is opaque and the other of which is transparent according to the binary values of the recorded bit, said recording supports being arranged in an aligned stack with said bit recording regions of each support in alignment;

means for directing a beam of radiation through selected areas in each of said aligned bit recording regions; and means for detecting when said beam emerges from said stack of optical supports.

3. An associative optical memory, as recited in claim 2, wherein said regions further comprise a third transparent area.

4. An associative optical memory, as recited in claim 2, wherein said means for directing said beam comprises polarization rotators and means for controlling said polarization rotators and wherein said beam is a polarized beam.

5. An associative optical memory system, comprising:

a plurality of optical recording supports for recording binary information as a function of the transparency of predetermined areas of such supports to radiation of a suitable wavelength, each support comprising a plurality of bit recording regions, each region comprising a transparent area, and two bit recording areas, one of which is opaque and the other of which is transparent according to the binary value of the recorded bit, said recording supports being arranged in a stack, wherein the bit recording regions are aligned in word recording lines, each support recording all the bits of the same order of a word;

an illuminating device for supplying as many collimated beams of said radiation as there are word recording lines, each beam being in register with a word recording line;

a plurality of electrooptical beam shifting devices, for transversely shifting the beams in response to shift control signals, each said beam shifting device being interposed between two subsequent recording supports, in such a way, that all beams may be controlled for striking, on each support, a corresponding selected one among the three areas comprised in each bit recording region;

and a photoelectric detecting device for detecting any beam emerging from said stack of said optical recording support, the shift control signals of said beam shifting devices being set in accordance to an interrogating word, in such a way, that in case the interrogating word matches at least one of the recorded words, the beam corresponding to said matching words meets only transparent areas along the word recording lines of such words.

6. The associative optical memory system of claim 5, comprising a plurality of electronic devices interposed between each recording support and the following beam shifting device for restoring the beam emerging from each recording support in a predetermined position in response to an electronic signal.

7. The associative optical memory system of claim 5, wherein each bit recording region is substantially square in shape, the transparent area being a rectangle substantially equal to the half of said square, and the bit recording areas occupying the two halves of the remaining rectangle.

8. The associative optical memory system of claim 5, wherein each bit recording region is substantially rectangular in shape, comprising three areas of substantially square shape, one of which is transparent and the other two are said bit recording areas.

* * * * *